United States Patent [19]
Dolgin

[11] Patent Number: 5,334,965
[45] Date of Patent: Aug. 2, 1994

[54] SUPERCONDUCTIVE MATERIAL AND MAGNETIC FIELD FOR DAMPING AND LEVITATION SUPPORT AND DAMPING OF CRYOGENIC INSTRUMENTS

[75] Inventor: Benjamin P. Dolgin, Northridge, Calif.

[73] Assignee: The United States of America as represented by the Administrator of the National Aeronautics and Space Administration, Washington, D.C.

[21] Appl. No.: 77,470

[22] Filed: Jun. 15, 1993

[51] Int. Cl.⁵ .................. H01F 1/00; H01H 47/00; H02B 5/00
[52] U.S. Cl. .................. 335/216; 361/141; 361/144; 335/285
[58] Field of Search .................. 335/216; 310/90.5; 361/141, 143, 144, 147, 146, 139; 156/DIG. 2; 104/281-286

[56] References Cited

U.S. PATENT DOCUMENTS

| | | | |
|---|---|---|---|
| 3,327,265 | 6/1967 | Geuns et al. | 335/216 |
| 3,370,205 | 2/1968 | Dukes | 310/90.5 |
| 3,512,852 | 5/1970 | North | 310/90.5 |
| 3,815,963 | 6/1974 | Wilk | 310/90.5 |
| 3,845,996 | 11/1974 | Geweke | 310/90.5 |
| 3,924,176 | 12/1975 | Fletcher | 324/43 R |
| 4,585,282 | 4/1986 | Bosley | 310/90.5 |
| 4,629,262 | 12/1986 | Hamilton | 310/90.5 |
| 4,797,386 | 1/1989 | Gryorgy | 505/1 |
| 4,841,772 | 6/1989 | Paik | 73/382 G |
| 4,874,346 | 10/1989 | Wachspress | 446/484 |
| 4,879,537 | 11/1989 | Marshall et al. | 335/216 |
| 4,910,633 | 3/1990 | Quinn | 361/144 |
| 4,975,669 | 12/1990 | Wojtowicz | 335/216 |
| 5,003,211 | 3/1991 | Groom | 310/90.5 |
| 5,003,235 | 3/1991 | Groom | 318/135 |
| 5,023,497 | 6/1991 | Pereny | 310/36 |
| 5,126,317 | 6/1992 | Agarwala | 505/1 |
| 5,155,651 | 10/1992 | Yoda | 361/144 |
| 5,168,183 | 12/1992 | Whitehead | 310/12 |
| 5,177,387 | 1/1993 | McMichael | 310/90.5 |

FOREIGN PATENT DOCUMENTS

| | | | |
|---|---|---|---|
| 0404147 | 12/1990 | European Pat. Off. | 335/216 |
| 0249403 | 10/1988 | Japan | 104/281 |
| 1138906 | 5/1989 | Japan | 104/281 |
| 0017806 | 1/1990 | Japan | 104/281 |
| 4131716 | 5/1992 | Japan | 310/90.5 |
| 0526296 | 2/1993 | Japan | 310/90.5 |
| 0533827 | 2/1993 | Japan | 310/90.5 |

Primary Examiner—Leo P. Picard
Assistant Examiner—Stephen T. Ryan
Attorney, Agent, or Firm—John H. Kusmiss; Thomas H. Jones; Guy M. Miller

[57] ABSTRACT

A superconductive load bearing support without a mechanical contact and vibration damping for cryogenic instruments in space. The levitation support and vibration damping is accomplished by the use of superconducting magnets and the "Meissner" effect. The assembly allows for transfer of vibration energy away from the cryogenic instrument which then can be damped by the use of either an electronic circuit or conventional vibration damping apparatus.

5 Claims, 1 Drawing Sheet

SUPERCONDUCTIVE MATERIAL AND MAGNETIC FIELD FOR DAMPING AND LEVITATION SUPPORT AND DAMPING OF CRYOGENIC INSTRUMENTS

ORIGIN OF INVENTION

The invention described herein was made in the performance of work under a NASA contract, and is subject to the provisions of Public Law 96-517 (35 USC 202) in which the contractor has elected not to retain title.

TECHNICAL FIELD

This invention relates to the use of superconductive material and magnets for the Meissner effect to provide both load bearing support and vibration damping of cryogenic instruments in spacecraft or aircraft without having any physical contact with the cryogenic instruments.

BACKGROUND ART

The damping of vibration and support of instrumentation during launch and acceleration of aircraft or spacecraft are two major issues in mechanical design of sensitive cryogenic instruments. Because of the high sensitivity of such cryogenic instruments to acceleration and vibration, and the extremely limited amount of coolant supply for such instruments, conventional supporting and damping techniques used during launch are unacceptable.

Conventional damping means produce too much heat within the cold chamber for the cryogenic instrument and a rigid supporting structure may cause damage to the instrument when the supporting platform is subjected to high accelerations or vibrations. There is therefore a need for a supporting system without any physical contact of the instrument from outside the cold chamber and with vibration damping that does not produce heat within the cold chamber.

Superconductive materials have been known since the beginning of the century. The most widely used demonstration of superconductive material involves the levitation of magnets over a superconductor. When it is cooled below the critical temperature $T_c$ of the material, the superconductor becomes perfectly diamagnetic. The interior of the superconductor thus experiences an expulsion of magnetic flux.

This effect discovered by Walther Meissner in 1933 manifests itself by producing a force that tends to repel the magnetic flux source. If the flux source is rigidly supported, that force causes a levitation effect on the superconductor, thus producing a free floating superconductor. This free floating effect was first disclosed in U.S. Pat. No. 3,327,265 in 1967.

Prior to 1986, applications of superconductors were limited due to the extreme low operating temperatures required by the superconductors. With the discovery of high $T_c$ superconductor materials that operate in the 90–100K range, which is higher than liquid nitrogen's boiling temperature, there was a renewed interest in applications for superconductors. The Meissner effect used for levitation is one application.

One such levitation application was disclosed in U.S. Pat. No. 4,797,386. A superconductor and magnet were used to induce a separation useful in creating low friction bearings. Another such levitation application disclosed in U.S. Pat. No. 4,879,537 employed magnetic field concentration and superconductive material for free floating an external load. U.S. Pat. No. 5,023,497 discloses another example of the Meissner effect used to generate unidirectional force in response to a current controllably conducted through a superconductor.

High $T_c$ superconductor materials are ideal for use of the Meissner effect in levitation of cryogenic instruments since the instruments already require cooling to a temperature below the $T_c$ of the superconductive materials. The use of superconductors for levitation support and vibration damping of cryogenic instruments is therefore feasible during launch and high acceleration intervals.

Although the use of interacting magnetic fields to produce levitation for load suspending purposes in general is well known, the combination of the Meissner effect of the superconductor in the cold chamber and vibration damping techniques discussed below have not been known to those skilled in the art of using the Meissner effect for levitation.

STATEMENT OF THE INVENTION

An object of this invention is to provide a load-bearing support without physical contact, i.e., levitation and vibration damping for precision cryogenic instruments aboard aircraft or spacecraft without any mechanical support within the cryogenic cold chamber in order to isolate the instruments from acceleration loads and vibrations during takeoff or launch and during any normal operation in flight or in space that may involve intervals of high acceleration and vibration.

In accordance with the present invention, a vibration damping and support system for cryogenic instruments inside a cold chamber comprises superconductive material attached to the cryogenic instrument and a magnetic flux source outside the cold chamber. Vibration damping means is attached to the magnetic flux source outside of the cold chamber. This allows the cryogenic instrument to be levitated by force generated by Meissner-effect repulsion and vibrational energy of the cryogenic instrument transferred to the magnetic flux source outside the cold chamber to be dampened by the vibration damping means. The vibration damping means may comprise a pick-up coil around the magnetic flux source. That pick-up coil is connected in series with a resistor so that vibrational energy will be transformed into electrical current in the pick-up coil, which is in turn transformed into heat in the series connected resistor. Alternatively, the magnetic flux source may be a permanent magnet and the vibration damping means may be a hydraulic damper connected to the permanent magnet. The magnetic flux source outside the cold chamber may instead be an electromagnet comprising a winding around a core and an electric power supply for electrical current through the winding, and the damping means may be a pick-up coil around the electromagnet core connected in series with a resistor. As before, vibrational energy is transformed into electrical current in the pick-up coil which is in turn transformed into heat in the series connected resistor. The electric power supply may be variable in response to a feedback signal, in which case the vibration damping means may comprise a position sensing means for producing a feedback signal for control of the variable electric power supply in response to any motion of the cryogenic instrument in the cold chamber. In that manner, position of the cryogenic instrument in the cold chamber is maintained constant.

The novel features that are considered characteristic of this invention are set forth with particularity in the appended claims. The invention will best be understood from the following description when read in conjunction with the accompanying drawings.

DETAILED DESCRIPTION OF THE INVENTION

Several embodiments of apparatus are disclosed in FIGS. 1 through 4 for use in providing both levitation support and vibration damping which depend upon the Meissner effect. The general concept of levitation and vibration damping apparatus involves using superconductive material inside the cold chamber in combination with damping means outside the cold chamber. This allows for transfer of vibration energy from inside the cold chamber to the outside where it is dampened. In each embodiment, superconductive material is attached to the cryogenic instrument in the cold chamber so that the instrument can be levitated by a magnetic field from a source, such as a permanent magnet in FIG. 1 or an electromagnet in FIG. 2 outside the cold chamber. The Meissner effect of the superconducting material will thus levitate the cryogenic instrument.

Figure 1:
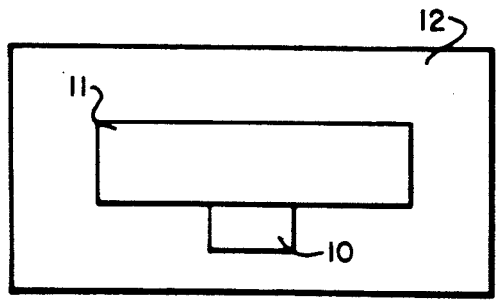
FIG. 1 is a schematic diagram of a cryogenic instrument levitation and vibrational damping apparatus using a permanent magnet as a flux source, a pick-up coil and a load resistor outside a cooling chamber for a cryogenic instrument.
Figure 1:
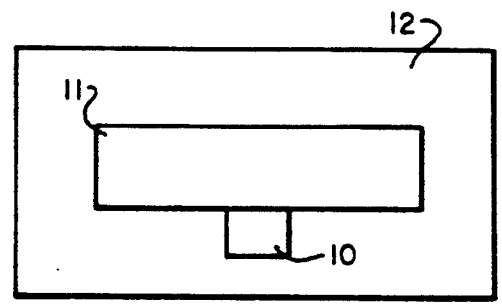
Figure 1:
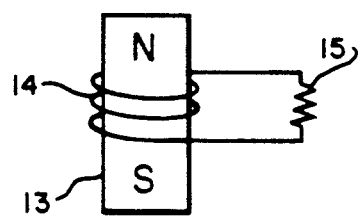

Referring to FIG. 1, superconductive material 10 is attached to a cryogenic instrument represented by a rectangular box 11 inside a cold chamber 12. The superconductive material 10 may be provided in the form of a coil with its two ends connected directly together. Alternatively, the entire bottom surface of the cryogenic instrument 11 can be coated with the superconductive material 10.

The cold chamber 12 is kept at a temperature t which is below the operating temperature $T_c$ of the superconductor material 10. A magnetic flux source 13 shown as a permanent magnet is placed outside the cold chamber 12 along with a pick-up coil 14 which senses any motion of the flux source 13. The coil 14 is connected in series with a resister 15 to dissipate the current energy by converting it into heat. Thus, the magnetic flux source 13 placed outside the cold chamber is provided with a pick-up coil 14 and a resistor 15 in series so that any movement of the cryogenic instrument in the cold chamber relative to the pick-up coil 14 outside the cold chamber changes the flux of the magnetic field between the superconductor 10 and the magnetic flux source 13 which then counteracts the motion of the instrument. Meantime, that change induces current in the pick-up coil 14 outside the cold chamber. This current energy is transformed into heat energy by the series resistor 15 connected to the pick-up coil. The effective result is that vibration energy inside the cold chamber is transformed into heat energy that is dissipated outside the cold chamber. The result is to dampen the vibrations of the instrument.

Figure 2:
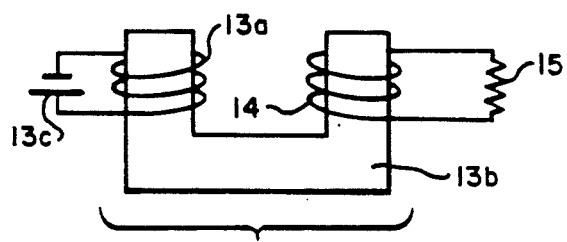
FIG. 2 is a schematic diagram of a levitation and vibrational damping apparatus as in FIG. 1 with an electromagnetic flux source.

As noted above, the magnetic flux source 13 may be an electromagnet 13' as shown in FIG. 2 comprising a winding 13a, a U-shaped core 13b and a power source 13c. Vibrational movement of the cryogenic instrument 11 changes the flux of the magnetic field between the magnetic flux source 13' outside the cold chamber and the superconductive material 10 inside the cold chamber. This change in flux induces current in the pick-up coil 14 which is transformed by the load resistor 15 into heat energy. Vibrations of the cryogenic instrument 11 are thus dampened, i.e., as the vibrational energy of the instrument inside the cold chamber 12 is transformed into heat energy outside of the cold chamber 12.

Figure 3:
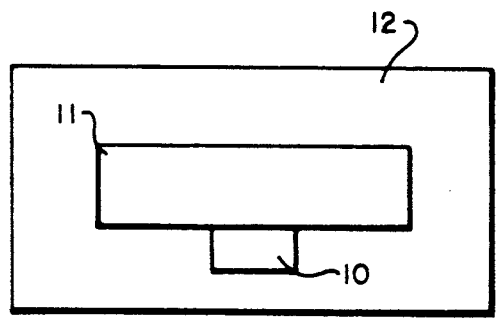
FIG. 3 is a schematic diagram of an alternative levitation and vibrational damping apparatus using a permanent magnet outside the cold chamber attached to a conventional vibration damping device.
Figure 3:
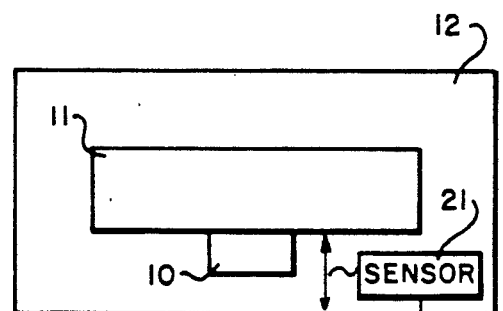
Figure 3:
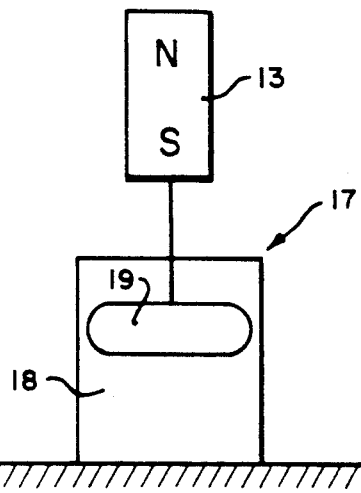

An alternative embodiment shown in FIG. 3 involves the use of a more conventional vibration damping device 17 outside of the cold chamber in combination with superconductive material inside the cold chamber but without any physical contact from inside the cold chamber to the vibration damping device. The superconductive material 10 is attached to the cryogenic instrument 11 inside the cold chamber 12 as in the first embodiment, and a magnetic flux source 13 placed outside the cold chamber is connected to the conventional vibration damping means 17.

The vibration of the cryogenic instrument induces a change in the flux of the magnetic field between the superconductor 10 in the cooled chamber and the magnetic flux source 13 outside the cold chamber. That change in flux causes movement of the magnetic flux source 13 outside the cooling chamber. This movement is dampened by the conventional vibrational damping device 17.

The magnetic flux source 13 outside the cold chamber 12 may be a permanent magnet as in FIG. 1. It is attached to the conventional vibration damping device 17, such as a hydraulic damper, which relies upon compression of a fluid in a chamber 18 by a piston 19 as it moves up or down with a controlled rate of flow of fluid through an orifice in the piston, for example, to equalize pressure on both sides of the piston as the magnet flux source 13 moves in response to any vibration of the instrument 10.

Vibration of the cryogenic instrument 11 causes a change in the flux of the magnetic field between the magnetic flux source 13 and the superconductive material 10. Due to the "Meissner" effect, the distance between the magnetic flux source 13 and the superconductive material 10 tends to remain constant causing vibration of the magnetic flux source 13 which is then dampened by the damping device 17.

Figure 4:
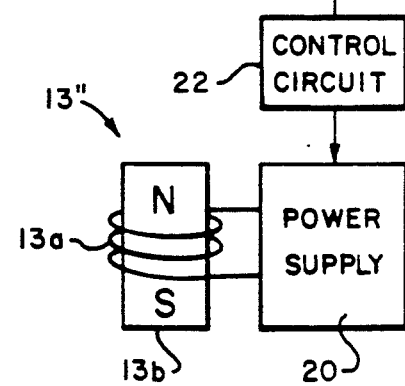
FIG. 4 is a schematic diagram of a cryogenic instrument levitation and damping apparatus as in FIG. 2 and having an instrument position sensor for regulation of the separation between the cryogenic instrument and the wall of the cold chamber.

In an alternative embodiment shown in FIG. 4, an optical sensing means 21 may be provided for detecting the position of the cryogenic instrument 11 relative to the body of the cold chamber 12 to provide a feedback signal to adjust the electric current through an electromagnetic flux source, thereby to maintain a constant separation between the superconductive material 10 and the wall of the cold chamber 12. Thus, the same superconductive material 10 attached to the cryogenic instrument 11 can be used for controlled levitation support and vibration damping by feedback control of an electromagnetic flux source 13" comprising a winding 13a, a core 13b and a variable power supply 20.

The cryogenic instrument 11 is levitated in the cold chamber 12 by the force of a magnetic field created by an electromagnet flux source 13" connected to the power supply 20. The position sensor 21 detects the position of the cryogenic instrument 11 relative to the wall of the cold chamber 12 and through the control circuit 22 provides a feedback signal that regulates the power supply 20, thereby to adjust the electromagnetic flux level in order to maintain a constant separation of the cryogenic instrument 11 from the cold chamber 12. This feedback controlled levitation apparatus will provide both controlled levitation support and vibration damping at the same time.

The advantage of each embodiment of this invention is that vibration of the cryogenic instrument is dampened without dissipation of heat inside the cold chamber, and of course the superconductive material attached to the instrument does not require additional cooling. Also, the combination of levitation and damping can be electronically controlled from outside the cold chamber by altering the magnetic flux created by an electronically variable electromagnetic source of that magnetic flux.

Although particular embodiments of the invention have been described and illustrated herein, it is recognized that modifications and variations may readily occur to those skilled in the art, such as providing a vibration damping and support system of a cryogenic instrument in space at more than one point of support, such as three points along three axes spaced with an angle of 120° between adjacent axes or at three points along three mutually perpendicular axes. A support and vibration damping system would then be replicated at each point of support. Consequently, it is intended that the claims be interpreted to cover such modifications and variations.

I claim:

1. A system for levitation which depends upon the Meissner effect and for vibration damping of a cryogenic instrument inside a cold chamber comprising
   superconductive material rigidly attached to or coated on said cryogenic instrument inside said cold chamber,
   a magnetic flux source outside said cold chamber,
   a vibration damping means attached to said magnetic flux source outside of said cold chamber, whereby said cryogenic instrument is levitated by force generated by Meissner-effect repulsion, and vibrational energy of said superconductive material rigidly attached to or coated on said cryogenic instrument is transferred to said magnetic flux source outside said cold chamber and there dampened by said vibration damping means.

2. A levitation and vibration damping system for a cryogenic instrument inside a cold chamber as defined in claim 1 wherein said vibration damping means comprises
   a pick-up coil around said magnetic flux source, said pick-up coil being connected in series with a resistor,
   whereby vibrational energy of said superconductive material is transformed into electrical current in said pick-up coil which is in turn transformed into heat in said series connected resistor to dampen vibration of said superconductive material and thereby dampen vibration of said cryogenic instrument.

3. A levitation and vibration damping system for cryogenic instruments inside a cold chamber as defined in claim 1 wherein said magnetic flux source comprises a permanent magnet and said vibration damping means comprises a hydraulic damper rigidly attached to said permanent magnet.

4. A levitation and vibration damping system for cryogenic instruments inside a cold chamber as defined in claim 2 wherein said magnetic flux source outside said cold chamber is an electromagnet comprising a winding around a core and an electrical power source for current through said winding.

5. A levitation and vibration damping system for a cryogenic instrument inside a cold chamber as defined in claim 4, wherein current from said electric power source is controlled in response to a feedback signal, and said vibration damping means comprises an optical position sensing means for producing a feedback signal for control of said variable electric power source in response to any motion of said cryogenic instrument with respect to said cold chamber, thereby maintaining position of said cryogenic instrument in said cold chamber constant while damping vibration of said cryogenic instrument.

* * * * *